United States Patent
Junk et al.

(10) Patent No.: US 6,954,683 B2
(45) Date of Patent: Oct. 11, 2005

(54) METHOD AND APPARATUS FOR PERFORMING DIAGNOSTICS IN A CONTROL LOOP OF A CONTROL VALVE

(75) Inventors: Kenneth W. Junk, Marshalltown, IA (US); Annette L. Latwesen, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/644,207

(22) Filed: Aug. 20, 2003

(65) Prior Publication Data

US 2004/0039488 A1 Feb. 26, 2004

Related U.S. Application Data

(62) Division of application No. 10/139,008, filed on May 3, 2002, now Pat. No. 6,678,584.

(51) Int. Cl.⁷ .......................... G05D 11/00; G05B 11/00
(52) U.S. Cl. ...................... 700/282; 700/272; 702/33; 702/114
(58) Field of Search .................... 700/272, 282.1, 700/282; 73/149; 137/386; 702/33, 45, 47, 114

(56) References Cited

U.S. PATENT DOCUMENTS

| | | |
|---|---|---|
| 4,061,155 A | 12/1977 | Sopha |
| 4,274,438 A | 6/1981 | La Coste |
| 4,976,546 A | 12/1990 | Beattie |
| 5,272,647 A | 12/1993 | Hayes |
| 5,425,270 A | 6/1995 | McDonald et al. |
| 5,806,565 A | 9/1998 | Kadlicko |
| 5,966,679 A | 10/1999 | Snowbarger et al. |
| 6,128,541 A | 10/2000 | Junk |
| 6,131,609 A | 10/2000 | Metso et al. |
| 6,192,321 B1 | 2/2001 | Grumstrup et al. |
| 6,408,735 B1 | 6/2002 | Harvey et al. |
| 2002/0040284 A1 | 4/2002 | Junk |

FOREIGN PATENT DOCUMENTS

EP 0462432 A2 12/1991

OTHER PUBLICATIONS

Beatty K: "Intelligent Valve Based Process Sensing and Control," Advances in Instrumentation and Control, Instrument Society of America, Research Triangle Park, U.S.. vol. 46, No. Part 2, 1991, pp. 1175–1185XP000347557, Issue No. 1054–0032.

A partial International Search Report for International application No. PCT/US03/03695, dated Jul. 2, 2003, 7 pages.

International Search Report for International Patent Application No. PCT/US03/03695, dated Sep. 9, 2003, 10 pages.

*Primary Examiner*—Jayprakash N. Gandhi
(74) *Attorney, Agent, or Firm*—Marshall, Gerstein & Borun LLP

(57) ABSTRACT

Method and apparatus for performing diagnostics in a pneumatic control loop for a control valve. Pressure and displacement sensors normally provided with a positioner are used to detect operating parameters of the control loop. A processor is programmed to receive feedback from the sensors and generate fault signals according to a logic sub-routine. The logic sub-routine may include calculating mass flow of control fluid through spool valve outlet ports and comparing other operating parameters of the control fluid to detect leaks and blockages in the control loop. Once a fault is detected, the location of the root cause of the fault may be identified by characterizing operating parameters of the control loop at the time of the fault.

29 Claims, 5 Drawing Sheets

METHOD AND APPARATUS FOR PERFORMING DIAGNOSTICS IN A CONTROL LOOP OF A CONTROL VALVE

CROSS-REFERENCE TO RELATED APPLICATION

This application is a divisional of prior application No. 10/139,008, filed May 3, 2002 now U.S. Pat. No. 6,678,584.

FIELD OF THE INVENTION

The present invention generally relates to control valves and, more particularly, to methods and apparatus for calculating fluid flow characteristics and performing diagnostics on control loop components for a control valve.

BACKGROUND OF THE INVENTION

Control valves are used to regulate process fluid flow through a pipe or conduit. Such valves typically include a throttling element disposed in the process fluid flow path and connected to an actuator. While various types of actuators are known, many control valves use a pneumatic actuator which uses air, natural gas, or other fluid under pressure to adjust the position of the actuator. In a spring and diaphragm actuator, for example, a spring applies a force to one side of the actuator while fluid pressure is controlled on an opposite side of the actuator, thereby adjusting the position of the throttling element. Alternatively, a piston actuator may be used in which the piston divides the actuator housing into upper and lower chambers and the fluid pressures of both chambers are controlled to drive the actuator to a desired position. In any type of pneumatic actuator there may be a nominal bleed-off of the control fluid to atmosphere.

A positioner (or servo controller) controls the fluid pressure supplied to one or both chambers of a pneumatic actuator. The positioner typically includes a processor, a current to pressure (I/P) converter, second stage pneumatics (i.e., a spool valve or pneumatic relay), and a valve travel feedback sensor. The I/P converter is connected to a supply pressure and delivers a desired control fluid pressure to a flexible diaphragm abutting the spool valve. The diaphragm controls the position of the spool valve to direct the control fluid toward a chamber of the actuator. Movement of the actuator causes a corresponding movement of the throttling element, thereby to control flow of its process fluid. The positioner further receives a reference signal, typically in the form of a command signal, from a process controller, compares the reference signal to valve travel feedback, and drive the I/P converter (and second stage pneumatics) to move the valve toward the reference signal.

With the growing use of processor-based control, the spool valves used in positioners have become heavily instrumented. When used with a piston actuator, for example, the spool valve will include an inlet port for receiving supply pressure, a first outlet port fluidly communicating with a first chamber of the actuator, and a second outlet port fluidly communicating with a second actuator chamber. Spool valves are known in which a pressure sensor is positioned at the inlet port, first outlet port, and second outlet port for providing feedback to the processor. In addition, conventional spool valves include a displacement sensor for detecting the position of the spool valve and providing a feedback signal to the processor.

Conventional positioners have components that are susceptible to various control fluid leaks or blockages that may degrade or disable operation of the control valve. The I/P converter, for example, includes an inlet having a sealed connection with the supply pressure. The I/P converter includes a restriction defining a primary orifice and a nozzle for directing control fluid toward a flapper. The I/P converter further includes a sealed outlet for directing control fluid to the spool valve. The I/P converter is often located at an industrial site where the surrounding air may be contaminated with oil, dissolved minerals, grit, and the like. Consequently, when such air is used as the control fluid, the contaminants may partially or completely plug the primary orifice or nozzle. In addition, the seals provided at the inlet and outlet of the I/P converter may fail. Such blockages or leaks may slowly degrade the performance of the control valve, resulting in inefficiencies, or may cause complete failure of the control valve. In either event, it is difficult to determine that the positioner is the cause of the fault, let alone to determine the specific location of the fault within the positioner.

Similarly, leaks may develop in the actuator housing or blockages may form in the connections between the spool valve and the actuator that may degrade control valve performance or cause failure. For example, a leak may form between the upper or lower actuator chamber and atmosphere, or a piston ring may fail causing leakage from one chamber to the other. In any of these circumstances, the processor must adjust its control signal for a given position of the throttling element. Leak detection is particularly important when the control medium is natural gas. Such leaks may develop over time and, in a noisy plant environment, may go unnoticed until the valve no longer operates.

DETAILED DESCRIPTION

Figure 1:
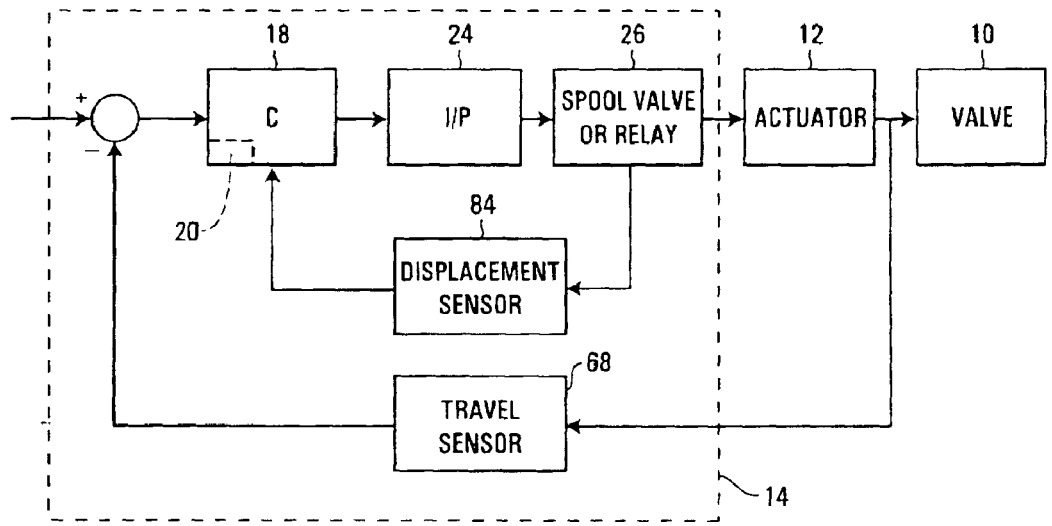
FIG. 1 is a schematic block diagram of a positioner attached to an actuator for a control valve.

A positioner 14 is schematically illustrated in FIG. 1 connected to an actuator 12. The actuator 12 is mechanically coupled to a valve body 10, which controls the flow of a process fluid through a conduit, such as a pipe (not shown). The positioner 14 includes a processor 18 having a memory 20, an I/P converter 24, second stage pneumatics (such as spool valve 26), a control fluid valve assembly displacement sensor 84, and a valve travel sensor 68, collectively referred to herein as a control loop. A reference signal, such as a command signal from a process controller, is provided to the positioner 14 and represents a desired actuator position. The positioner 14 compares the reference signal to the actual actuator position provided by the travel sensor 68 and forwards an error signal to the processor 18. The processor then generates an electronic I/P drive signal based on the error signal and feedback from the displacement sensor 84.

Figure 2:
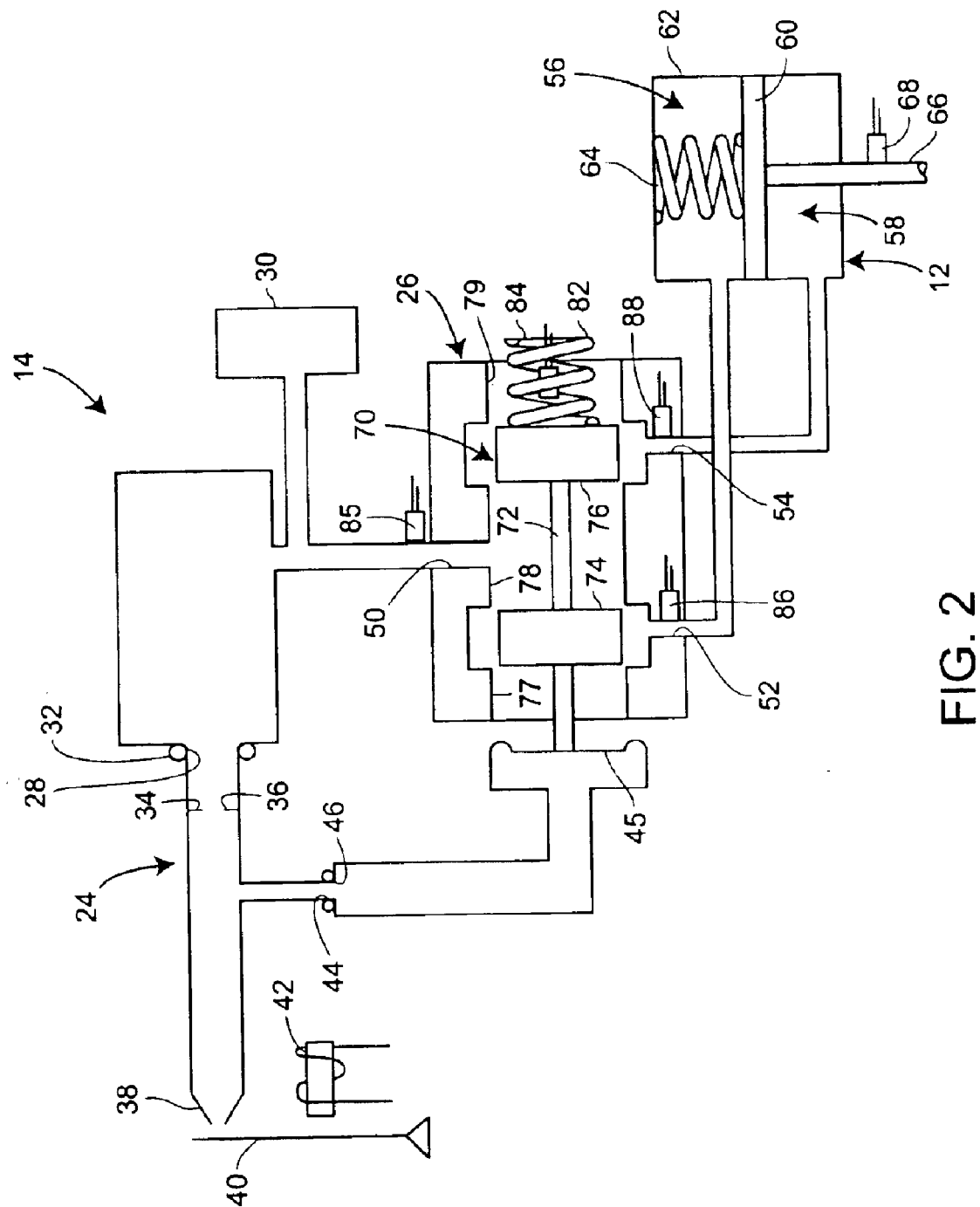
FIG. 2 is an enlarged schematic representation of the positioner shown in FIG. 1.

As shown in greater detail in FIG. 2, the actuator 12 includes a piston 60 which divides the actuator housing 62 into the upper and lower chambers 56, 58. The upper chamber 56 includes a spring 64 for applying a force to the piston. A stem 66 extends from the piston 62 to the valve body 10. A travel sensor 68 may be provided for detecting the position of the stem 66 and providing feedback to the processor 18.

According to the illustrated embodiment, the I/P converter 24 provides a signal amplification stage and the spool valve 26 provides a pneumatic amplification stage. The I/P converter 24 includes an inlet 28 in fluid communication with a supply of control fluid under pressure 30. A connection between the inlet 28 and control fluid supply 30 may be sealed with an O-ring 32. A restriction 34 disposed in the I/P connector 24 defines a primary orifice 36. A nozzle 38 is provided downstream from the primary orifice 36 for directing control fluid toward a flexible flapper 40. In the illustrated embodiment, a solenoid coil 42 is provided for positioning the flapper 40 with respect to the nozzle 38. Alternatively, the solenoid coil 42 may be removed and the flapper 40 may be formed of a piezoelectric material, or any other known flapper construction may be used. An outlet 44 fluidly communicates with a diaphragm 45. The connection between the outlet 44 and the diaphragm 45 may be sealed by an O-ring 46. A sensor 85 may be provided for detecting a supply pressure of the control fluid entering the I/P converter 24.

The spool valve 26 includes an inlet port 50 for receiving control fluid from the control fluid supply 30. First and second outlet ports 52, 54 may be provided in fluid communication with upper and lower chambers 56, 58 of the actuator 12. A valve member 70 is disposed inside the spool valve housing for controlling fluid communication between the inlet port 50 and the first and second outlet ports 52, 54. In the illustrated embodiment, the valve member 70 includes a rod 72 carrying first and second lands 74, 76. An annular valve chamber 77 is formed in the spool valve housing and sized to closely fit the first and second lands 74, 76. The diaphragm 45, which receives a pressure signal from the I/P converter 24, engages a first end of the valve member 70. A spring 82 engages an opposite end of the valve member 70 to apply a bias load to the valve member 70.

In operation, a control fluid pressure regulated by the I/P converter 24 is output to the diaphragm 45 which applies a load to the valve member 70 in a direction opposite the bias load of the spring 82. Movement of the first and second disks, 74, 76 will partially or completely block fluid flow from the inlet port 50 to either of the first and second outlet ports 52, 54. Accordingly, the position of the valve member 70 determines an area of restriction for each outlet port 52, 54 through which control fluid may flow. A displacement sensor 84 is located to detect a position of the valve member 70 and provide feedback to the processor 18. In addition, first and second outlet pressure sensors 86, 88 are provided for detecting control fluid pressure levels at the first and second outlet ports 52, 54, respectively.

While FIG. 2 illustrates a double-acting piston actuator with fail-closed spring action, it will be appreciated that other types of pneumatic actuators may be used. Examples of alternative actuators include a double-acting piston actuator with fail-open spring action, a double-acting piston actuator with no spring, a single-acting spring-and-diaphragm actuator with fail-open or fail-closed spring action, or any known substitute. If the actuator is single-acting, the spool valve 26 includes a single outlet port in fluid communication with the actuator chamber opposite the spring.

Figure 6:
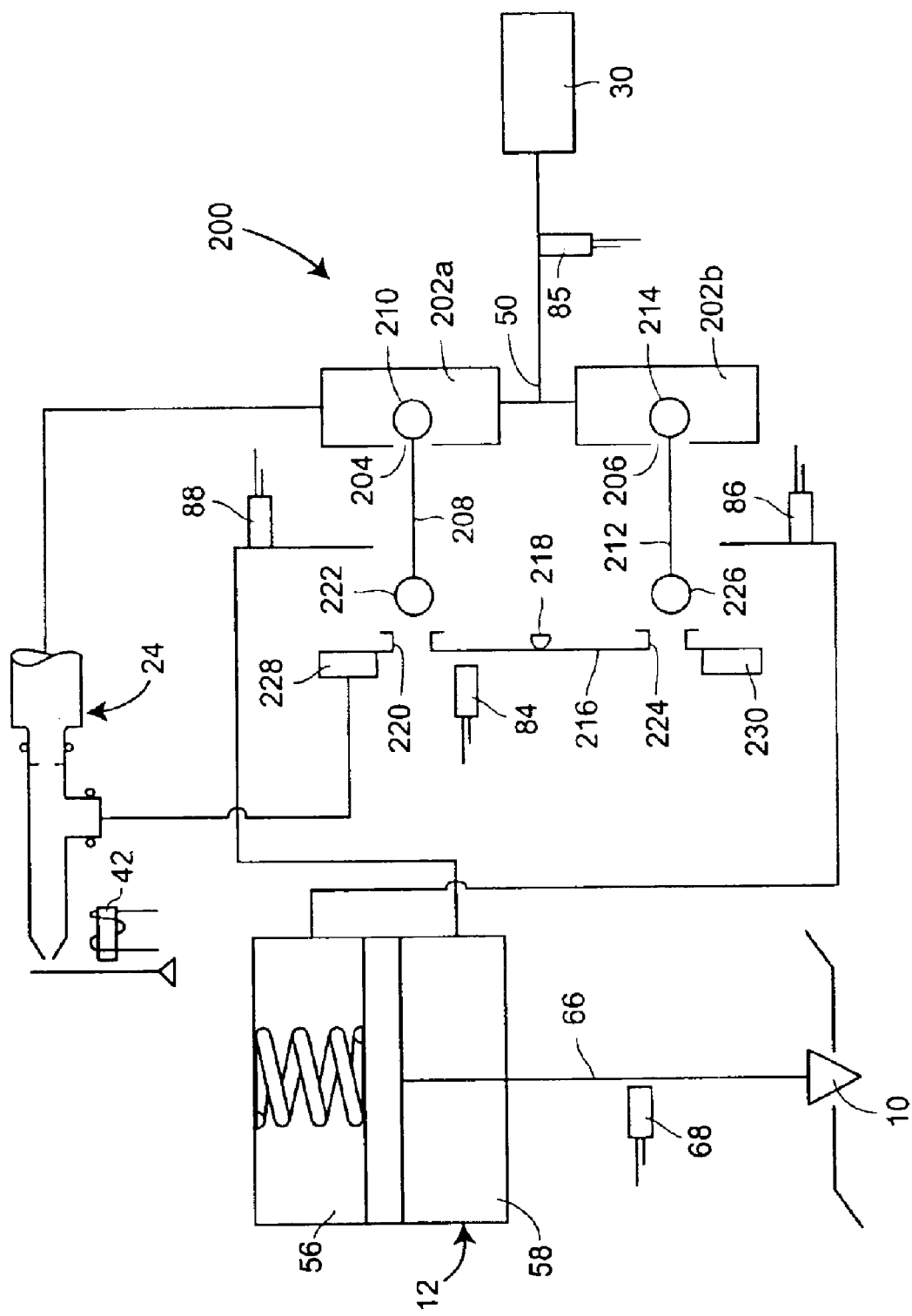
FIG. 6 is a schematic of an alternative embodiment of the positioner having a pneumatic relay for the second stage pneumatics.

Still further, the positioner 14 may use alternative means for the second stage pneumatics. Instead of the spool valve 26, the positioner may include, for example, a pneumatic relay. A double-acting pneumatic relay 200 is illustrated in FIG. 6 attached to the I/P converter 24, valve body 12, and source of pressurized supply fluid 30. The relay 200 includes supply pressure plenums 202a, 202b. Plenum 202a includes a first outlet port 204 in fluid communication with the actuator lower chamber 58, while plenum 202b has a second outlet port 206 in fluid communication with the actuator upper chamber 56. A first poppet valve 208 has an end 210 positioned to removably engage the first aperture 204, while a second poppet valve 212 has an end 214 positioned to removably engage the second aperture 206. A beam 216 is supported for rotation about fulcrum 218, and includes a first orifice 220 positioned to engage a second end 222 of the first poppet valve 208 and a second orifice 224 positioned to engage a second end 226 of the second poppet valve 212. Output from the I/P converter 24 is provided to chamber 228 to rotate the beam 216 in a first direction (i.e., clockwise in FIG. 6) while a reference chamber 230 is provided with a reference pressure to counterbalance the force of the chamber 228. The first poppet valve 208 controls flow of control fluid to the actuator lower chamber 58 while the second poppet valve 212 controls flow to the actuator upper chamber 56.

In operation, when the I/P nozzle pressure increases, the beam 216 will rotate clockwise forcing the first poppet valve 208 to the right. The second end 222 of the first poppet valve 208 closes off the first orifice 220 to prevent flow to atmosphere, while the first end 210 of the first poppet valve 208 opens the first outlet port 204 to allow control fluid at the supply pressure to flow to the lower chamber 58. At the same time, the second poppet valve 212 opens the second orifice 224 and closes the second outlet port 206 to allow control fluid to exhaust from the upper chamber 56 to atmosphere. The opposite occurs when the I/P nozzle pressure decreases. It will be appreciated that as the first and second poppet valves 208, 212 move into and out of the first and second outlet ports 204, 206, the area of restriction of the outlet ports 204, 206 are varied. Accordingly, the position of the beam 216 may be used to infer the position of the poppet valves 208, 212 and, therefore, the area of restriction through the first and second outlet ports 204, 206.

The positioner with pneumatic relay 200 may include the same sensors as described above. Accordingly, the first and second outlet pressure sensors 86, 88 are positioned near the first and second outlet ports 52, 54 to detect control fluid pressure to the upper and lower actuator chambers 56, 58, respectively. The inlet pressure sensor 85 is positioned at the inlet port 50 to detect control fluid supply pressure, while the actuator travel sensor 68 is positioned to detect the position of the stem 66. In addition, the displacement sensor 84 is positioned to detect the position of the beam 216.

The positioners described above are generally known in the art. Up to now, however, the displacement sensor has been used strictly to provide feedback. In accordance with the teachings of the present invention, the displacement sensor may also be used for diagnostic purposes. In addition, the various sensors may be used to discriminate between the various fault conditions possible in the positioner. The sensors may also be used to calculate mass flow of control fluid, which may be used to help identify root causes of the faults. The diagnostic calculations and analysis may be performed by a diagnostics unit provided with the positioner 14, such as where the processor 18 and memory 20 function as the diagnostics unit, or in a remote host 19 communicatively coupled to the positioner 14.

With respect to the actuator 12, the diagnostics unit may be programmed with a diagnostics routine that uses feedback from the sensors to estimate mass flow of control fluid to the actuator chambers. The diagnostics routine may further use the calculated mass flows, with or without additional feedback parameters, to identify leaks or other faults in the actuator. More specifically, the mass flow of control fluid through the first and second outlet ports may be approximated using the following equation:

$$dm/dt = KYAg_c(2\rho(p_1-p_2))^{1/2}$$

where:

$dm/dt$=mass flow rate (lbm/s);
$K$=a discharge coefficient;
$Y$=an expansion factor;
$A$=an area of restriction (ft$^2$);
$g_c$=a conversion constant (lbm/slug);
$p_1$=upstream pressure (lbf/ft$^2$, abs.);
$p_2$=downstream pressure (lbf/ft$^2$, abs.); and
$\rho$=an upstream fluid density (slug/ft$^3$).

To calculate mass flow through the first outlet port 52, for example, the appropriate coefficients and variables are inserted into the above equation. Upstream pressure $p_1$ is the inlet pressure sensed by pressure sensor 85 and $p_2$ is the pressure detected by sensor 86 at the first outlet port 52. The equation may be used to estimate both supplying and exhausting mass flows. For example, when spool valve displacement is positive (i.e., to the right in FIG. 2), port 54 will supply control fluid to the lower actuator chamber while port 52 exhausts control fluid from the upper actuator chamber. For port 54, spool valve displacement may be used to calculate the exposed port area and sensors 85, 88 may provide the upstream and downstream pressures. For port 52, pool valve displacement may be used to calculate the exposed port area and sensor 85 may provide upstream pressure. A sensor on the exhaust port is not required since the spool exhausts to atmosphere, which is at a known pressure. In addition, supply pressure to the control valve is often regulated, and therefore the supply pressure sensor 85 may be eliminated and a fixed value that approximates the supply pressure may be substituted into the air mass flow equation.

When the control fluid is air, the above equation may be reduced to:

$$dm/dt = 0.048 KYA(p_1-p_2))^{1/2}$$

The mass flow equation may be similarly reduced for other fluids, such as natural gas. In addition to the above-noted equations for estimating mass flows through an orifice, standard flow equations, such as those noted in *ISA-575.01-1985: Flow Equations For Sizing Control Valves*, may be used. The mass flow estimates obtained by the above equations have been found to closely match measurements made with an external air mass flow sensor, especially when using a low-pass digital filter to attenuate bit noise. Accordingly, the diagnostics unit 18 may be programmed to receive feedback from the pressure sensors 85, 86, 88 and the displacement sensor 84 and calculate mass flow through the first and second outlet ports 52, 54 using the above equation.

The above equations may be modified to correct for leakage flow across the lands, and may also be used to calculate mass flow through alternative second stage pneumatics, such as the pneumatic relay 200 of FIG. 6.

Figure 3A:
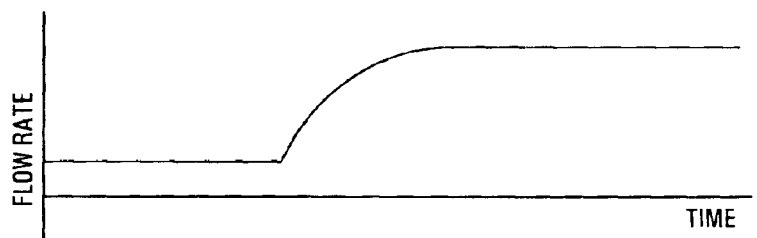
FIGS. 3A and 3B are graphs illustrating control fluid mass flow profiles for a spring and diaphragm actuator experiencing leak and blockage, respectively.

The diagnostics routine may use the mass flow calculations to identify leaks or blockages between the spool valve and the actuator 12. For example, in a spring-and-diaphragm actuator, control fluid is provided to a single actuator chamber opposite the spring. During normal operation, the processor 18 controls output of control fluid from the spool valve 26 to drive the actuator 12 and connected throttling element to a desired set point. During steady state operation, a small amount of fluid may bleed to atmosphere, and therefore a small amount of control fluid will flow through the spool valve outlet port. If a leak develops in the actuator chamber or in the connection between the spool valve outlet port and the actuator, the pressure level inside the actuator chamber will drop and the spring will cause the actuator to move from its desired position. Feedback regarding process fluid pressure and/or actuator travel is provided to the processor 18, and the processor 18 will alter the drive signal to the I/P converter 24 to increase control fluid flow to the actuator. Consequently, mass flow to the actuator will increase as illustrated in the graph provided at FIG. 3A. By estimating mass flow of control fluid over time, the diagnostics unit may be programmed to detect increases in control fluid flow to the actuator. The diagnostics unit may further be programmed with a maximum control fluid flow rate above which the diagnostics routine will generate a fault signal. A low pass filter may be used to minimize the chance of normal transients generating a false signal.

Figure 3B:
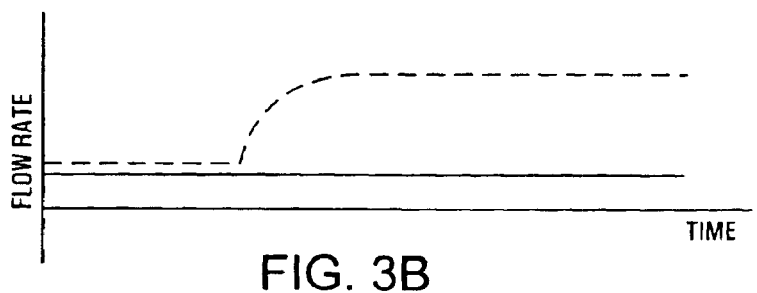

Conversely, blockage in the air line between the spool valve and the actuator 12 may be identified when control fluid flow is constant as spool valve displacement increases. FIG. 3B illustrates a blockage situation, where the solid line represents mass flow and the dashed line represents spool displacement. Similarly, a partial blockage may be identified if spool displacement is large but mass flow is relatively small.

Detecting leaks in a piston actuator is slightly more complicated. The leak may occur in the actuator chamber with the spring, the actuator chamber without the spring, or between the actuator chambers, such as when there is a leak in a piston ring or when a bypass valve on the actuator has been left open. As with the spring-and-diaphragm actuator, however, deviation in air mass flow can be used to locate and quantify leaks or obstructions.

To help identify faults, deviations from normal operating parameters may be identified. One such parameter is the pressure inside the actuator chambers, which is typically maintained at roughly 60–80% of the supply pressure. An average or "crossover" pressure may be determined by averaging the pressures in the actuator chambers.

Figure 4A:
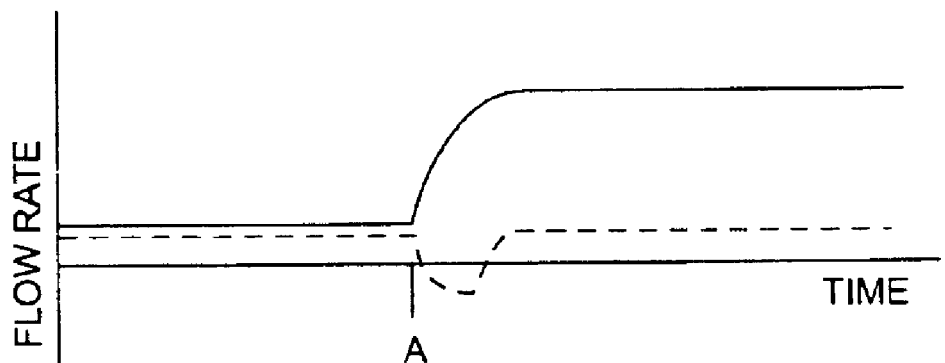
FIGS. 4A, 4B, and 4C are graphs illustrating control fluid mass flow profiles for a piston actuator experiencing control fluid leaks in a first chamber, second chamber, and piston ring, respectively.
Figure 4B:
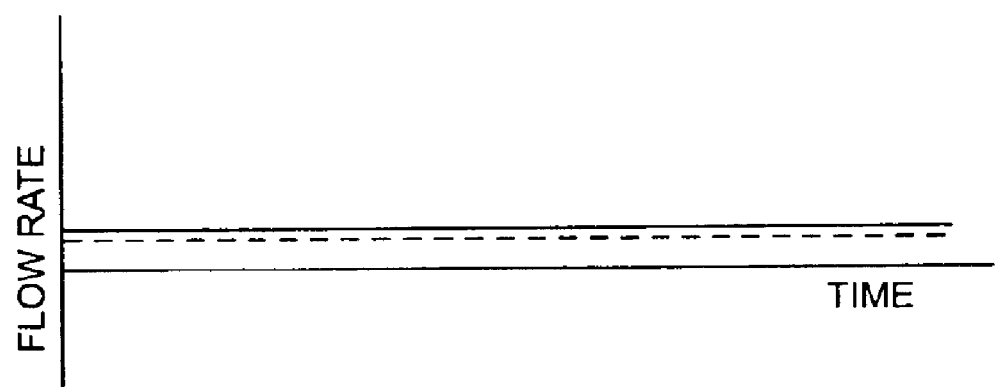

If there is a leak to atmosphere in the chamber opposing the spring, the processor 18 will move the spool valve 26 to provide make-up air to that chamber. This will also depressurize the chamber with the spring, so that the piston actuator behaves effectively like a spring and diaphragm actuator. The mass flow profile through the first and second outlet ports 52, 54 for such a leak are shown in FIG. 4A. Initially, there is a nominal mass flow through both outlet ports 52, 54 due to normal leakage in the system. When a leak develops at point A, mass flow to the chamber with the leak will increase to equal the amount of air exhausted to atmosphere, as shown by the solid line in FIG. 4A. For the chamber with the spring, mass flow will be temporarily out of the chamber as the actuator moves to a new position, but will eventually return to near zero since the chamber is depressurized, as shown in the broken line in FIG. 4A. Furthermore, the crossover pressure in the actuator will be approximately one-half of the pressure in the chamber opposite the spring.

If a leak develops in the spring-side chamber of the actuator, the positioner 14 does not provide make-up air since that would require the positioner to exhaust air (and reduce the force) from the chamber opposing the spring. Accordingly, the processor 18 allows the chamber with the spring to become depressurized and will control the valve by adjusting the pressure in the opposite chamber. At steady state, air mass flow to the spring-side chamber will be near zero, air mass flow from the chamber opposing the spring will be near zero, and the crossover pressure will be one-half of the pressure in the chamber without the spring. Accordingly, by detecting the decreased crossover pressure in the mass flow profiles through each port, the presence and location of a leak may be determined.

The mass flow calculations may further be used by the diagnostics unit to detect leaks which result in control fluid flowing from one actuator chamber to the other, such as leaks in the piston ring. Such a leak may be difficult to detect using traditional measurement techniques since each chamber may remain pressurized. If the leak causes control fluid flow from the lower chamber 58 to the upper chamber 56, for example, the positioner 14 will move the spool to provide make-up control fluid to the lower chamber 58. At the same time, however, control fluid will flow from the lower chamber 58 to the upper chamber 56 and back to the spool valve 26.

Figure 4C:
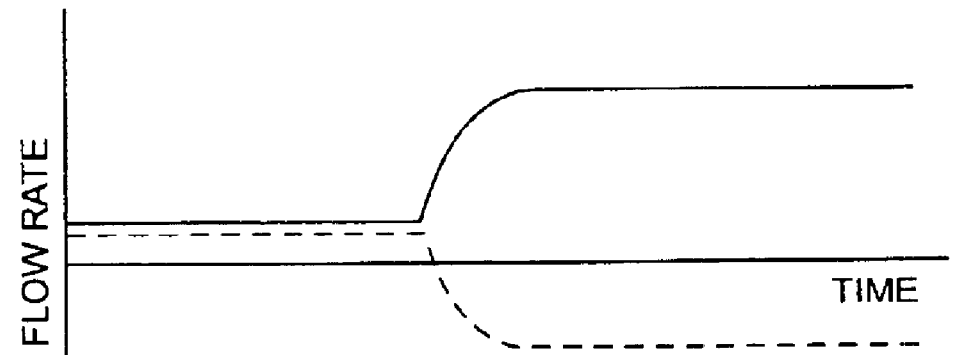

A graph illustrating fluid flow profiles through each outlet port 52, 54 for a piston ring leak is provided at FIG. 4C, wherein fluid flow through the first outlet port 52 is shown in a dashed line while fluid flow through the second outlet port 54 is shown in a solid line. Initially, each port has a nominal flow rate that discharges to atmosphere. When the leak in the piston ring develops, mass flow through the second outlet port 54 increases while mass flow through the first outlet port 52 decreases by a proportional amount. Unlike conventional mass flow sensors which do not indicate the direction of fluid flow, the mass flow approximation equation indicates direction of flow, wherein a positive number represents fluid flow into the actuator while a negative number represents fluid flow out of the actuator. Accordingly, by monitoring control fluid flow through the first and second outlet ports 52, 54, the processor 18 may detect a sustained situation where fluid flow through one port is positive while fluid flow through the other port is negative, and generate a fault signal.

In addition to detecting control fluid leaks and blockages to the actuator, the pressure and displacement sensors of the spool valve may also be used to detect faults in the I/P converter 24 located upstream of the spool valve 26. Various types of faults may occur in the I/P converter 24 that will disrupt or stop control fluid flow to the spool valve 26, thereby degrading or disabling control valve operation. Because specific components of the I/P converter, such as the flapper 40, are not directly applicable to servo control, these components are not typically instrumented. It has been found, however, that the sensors provided with the spool valve 26 may be used to infer the internal states of the I/P converter components.

Before addressing the specific faults that may occur in the I/P converter 24, it should be noted that the control fluid supply 30 that provides pressurized control fluid to the I/P converter may fail, and therefore this fault should be addressed before considering other failures in the I/P converter 24 itself. Accordingly, the signal provided by the inlet pressure sensor 85 may be used to detect whether the control fluid supply 30 has lost pressure.

One fault that may occur within the I/P converter 24 is the complete plugging of the primary orifice 36. When the primary orifice 36 is plugged, pressure to the diaphragm 45 will decrease so that the spring 82 moves the spool valve 70 to a zero pressure (or negative) state, causing the actuator to move accordingly. The processor 18 will increase the drive signal to the solenoid coil 42 in an attempt to close or cap off the nozzle 38, which normally would increase control fluid pressure exiting the outlet 44. Instead, the plugged primary orifice 36 prevents any flow of control fluid.

A fault may also arise when mineral deposits or other contaminants build up on the flapper 40 so that the nozzle 38 is completely plugged. In this case, control fluid pressure out of the outlet 44 increases to the supply pressure and causes the spool valve to move away from a null position to a positive position, thereby moving the actuator. In response, the processor 18 will decrease the drive signal to the I/P converter 24 in an attempt to open or uncap the nozzle 38.

Alternatively, the primary orifice may become partially plugged. As with a completely plugged primary orifice, a partial plugging will move the drive signal higher as the processor 18 attempts to compensate for the reduced air to the nozzle 38. A partially plugged primary orifice will slow down movement of the spool valve in response to changes in the I/P signal. Increased time constant may, however, result from low ambient temperature, which stiffens the diaphragm. In any event, when the I/P drive signal is high and all other states are operating properly, then it may be inferred that the primary orifice is partially plugged.

Similarly, the nozzle 38 may become partially plugged. Partial plugging of the nozzle 38 also affects the time constant of the I/P converter which, as noted above, may also be caused by the effect of changes in ambient temperature on the diaphragm. Accordingly, a low I/P drive signal with all other states nominal may indicate a partially plugged nozzle.

A further fault may arise from failure of the outlet O-ring 46. To compensate for a leak through the outlet-ring 46, the processor 18 will increase the drive signal, but the time constant of the I/P converter will not be altered significantly. Accordingly, failure of the outlet O-ring 46 will affect operation of the control loop in a manner similar to a plugged primary orifice 36.

Further faults in addition to those specifically noted above may also occur in the I/P converter. For example, the solenoid coil 42 may fail or the flapper 40 may break. While it may not be possible to discern the specific failure, each fault may be detected by monitoring for significant deviations in the drive signal to the I/P converter. This may be accomplished by putting a linear or nonlinear digital filter on the drive signal to remove high frequency content and looking for deviations from normal operating conditions.

To help identify and characterize various faults in the I/P converter 24, the diagnostics unit, such as the processor 18 and memory 20 of the positioner 14 or the remote host 19 having a processor and memory, may be programmed to perform a diagnostics routine based on the parameters measured by various sensors of the positioner 14. The diagnostics routine may include one or more logic subroutines in which the measured parameters are characterized to develop a fault template, which may be used to identify one or more root causes for a fault.

A fault must first be detected before it may be characterized. The diagnostics routine may be programmed to detect sustained deviations in the I/P drive signal. The I/P drive signal may be set at approximately 70% to center the spool valve at its null position. A normal operating range for the drive signal may be 60–80%. Accordingly, diagnostics routine may generate a fault signal when the I/P drive signal moves outside of the normal operating range (i.e., less than 60% or more than 80%). An order statistics filter may be used to remove normal transients, so that a fault signal is generated only when the I/P drive signal is outside of the normal range for a sustained period of time. Alternatively, the diagnostics unit may be programmed to monitor for large shifts in the nominal position of the spool valve, or to monitor an error signal (i.e., valve stem travel deviation from reference), to trigger a fault analysis. In either event, once a fault has been detected, control fluid pressure at the supply 30 should first be checked so that it may be ruled out as a cause of the fault.

Once a fault has been detected, it may be characterized to determine its general or specific location within the control loop. After the deviation has been detected in the I/P drive signal, the fault can be located by tracing the deviation back through the control loop. For a blocked primary orifice 36, for example, the control loop will be affected as follows: flow through the primary orifice 36 will stop, causing the spool valve to move to its zero pressure (negative) state, which in turn decreases pressure in the actuator chamber, which causes the throttling element to move, which generates an error signal back to the processor. The processor will increase the I/P drive signal to compensate for the fault.

To identify the specific location of the fault, one must proceed backwards through this chain of events. For the completely plugged primary orifice example, the analysis begins with detection of an I/P drive signal above the upper limit of the normal operating range (i.e., a positive I/P drive signal deviation). Next, the error signal generated by movement of the throttling element is characterized as largely positive, which means the actual actuator travel is less than desired. A differential pressure between outlet port pressures, where the pressure at the first inlet port 52 is subtracted from the pressure at the second outlet port 54, may then be characterized as being negative. Next, the displacement sensor 84 provides feedback regarding the spool valve position, which would be characterized as largely negative with respect to its null position due to the control fluid pressure reduction caused by the blockage. By characterizing the measured parameters in this fashion, certain root causes for the fault may be eliminated. Several root causes may have the foregoing characteristics, of which a blocked primary orifice is one.

Figure 5:
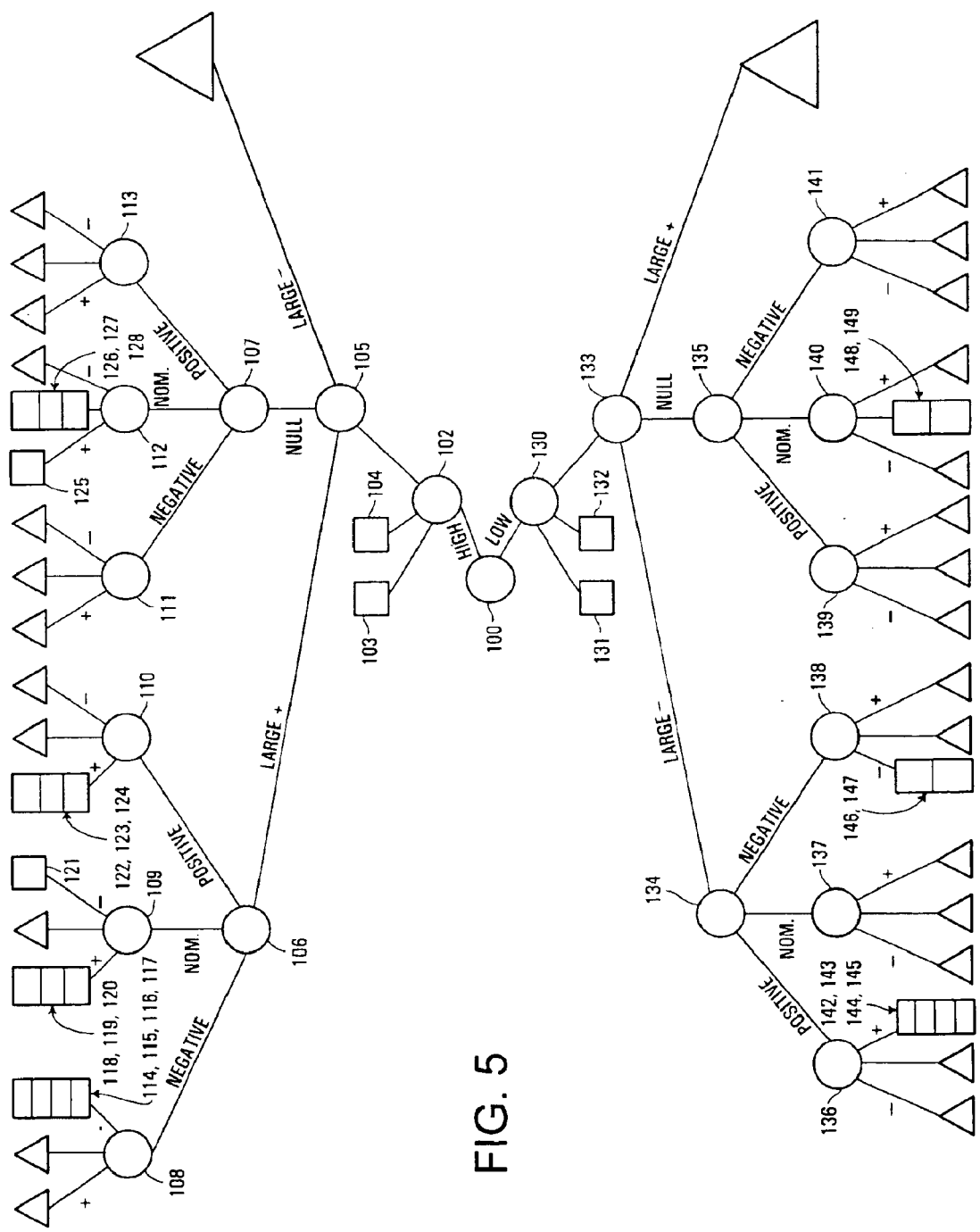
FIG. 5 is a decision tree schematically illustrating a logic sub-routine for characterizing and locating component faults.

In a similar fashion, all faults may be mapped out using a decision tree, as illustrated in FIG. 5. In FIG. 5, measured variables are denoted by circles, the characterized values of those parameters are labeled on the lines emanating from the circles, and component failures are denoted by squares. Triangles denote invalid regions such as, for example, the combination of a large drive signal and a large negative error signal, which is not possible. The diagnostics routine illustrated in FIG. 5 is based on existing sensors commonly provided with positioners, and therefore certain component failures that are indistinguishable have been grouped together in FIG. 5. Additional sensors may be used to further distinguish the grouped component failures. Component faults cascade down through the tree until the I/P drive signal deviates. The root cause of the deviation may then be identified by moving backwards through the tree.

More specifically, at measurement 100 the diagnostics routine may detect an I/P drive signal that deviates from the normal operating range. The drive signal may be characterized as high if it is above the range and low if it is below the range. If the I/P drive signal is high, the stored diagnostics routine will proceed up in the tree to characterize a reference signal used in the control loop. The reference signal may be the command signal sent to the positioner from a process controller. The I/P drive signal is a function of the difference between the reference and travel feedback.

There are three scenarios where the I/P drive signal may be above or below its normal operating point, two of which are not the result of an equipment fault. The first is when the controller is in "cutoff." Cutoff occurs when the reference signal exceeds a user-defined threshold. When in high-cutoff, the servo controller is bypassed altogether and a 100% drive signal is sent to the I/P. When in low-cutoff, the servo controller is bypassed and a 0% drive signal is sent to the I/P. Both high- and low-cutoff are valid operating regions, and do not indicate an equipment fault. High- and low-cutoff are indicated in FIG. 5 at boxes 103, 131, respectively.

The second scenario is when the valve body engages a travel stop. When the valve body hits a stop, travel feedback is no longer active and the process controller essentially operates open-loop. Again, this is normal control valve behavior and does not indicate an equipment fault. High and low travel stops are indicated in FIG. 5 at boxes 104, 132, respectively.

The third scenario is where an equipment fault has caused a large error signal. In order to compensate for a large error signal, the I/P drive signal is adjusted accordingly. Once cutoffs and travel stops are ruled out, the analysis may proceed along the decision tree set forth in FIG. 5. For a high I/P drive signal, the analysis proceeds up the tree, while for a low I/P drive signal, the analysis proceeds down the tree.

A high I/P drive signal is first analyzed by characterizing the error signal at 105. The error signal may be classified as largely positive, null, or largely negative. When the I/P drive signal is high, it is not possible to have a large negative error signal, and therefore the upper right branch of FIG. 5 indicates that all outcomes are not valid. Accordingly, the only possible outcomes from the error signal characterization 105 are largely positive (i.e., the reference signal is greater than the actual travel feedback signal) or null. In either event, the diagnostics routine will next proceed to characterize a pressure differential between the first and second outlet ports 52, 54 by subtracting the pressure at the first outlet port 52 from the pressure at the second outlet port 54, as indicated at 106, 107. The pressure differential may be characterized as being negative near the supply pressure, nominal, or positive near the supply pressure. A negative pressure differential indicates that pressure at the first outlet port 52 is greater than that at the second outlet port 54. The converse is true for a positive pressure differential. A nominal pressure differential indicates that the actuator chambers are substantially balanced. For each pressure differential characterization, the diagnostics routine will proceed to characterize the position of the spool valve, as indicated at 108–113. The spool valve position may be characterized as being largely positive, null, or largely negative. A large positive position indicates that the diaphragm 45 has pushed the spool valve too far, while a large negative means the opposite. The spool valve is at the null position when it remains within a normal operating range.

Once the spool valve position has been characterized, one or more potential root causes may be identified for the I/P drive signal deviation. If, for example, the spool valve is jammed 114, the outlet O-ring 46 has failed 115, the diaphragm 45 has failed 116, or the primary orifice 36 is completely plugged 117, the diagnostics routine will have characterized the fault as having the largely negative spool position, a negative pressure differential, and a largely positive error signal for a high I/P drive signal. If the fault is characterized as having a largely positive spool valve position, a nominal pressure differential, and a largely positive error signal for a high I/P drive signal, the root cause may be an external leak 118, a worn spool valve 119, or a low supply pressure 120. For a fault having a largely negative spool valve position, nominal pressure differential, and a largely positive error signal for a high I/P drive signal, the root cause may be a low pressure supply 121.

If, for a high I/P drive signal, the error signal is largely positive, the pressure differential is positive, and the spool valve position is largely positive, the root cause may be the valve body being stuck in a low position 122, a blocked air line between the spool valve and the actuator 123, or an active interlock 124.

If a fault is characterized as having a largely positive spool valve position, a nominal pressure differential, and a null error signal for a high I/P drive signal, the root cause may be an external leak 125. If the spool position is characterized as null, the pressure differential is nominal, and the error signal is null for a high I/P drive signal, the root cause for the fault may be a primary orifice 36 that is partially plugged 126, the presence of grit in the I/P flapper or armature 127, or an I/P calibration shift 128.

Turning to the bottom half of FIG. 5, the diagnostics routine may conduct a similar process for a low I/P drive signal. After ruling out low-cutoff 131 and low travel stop 132, the analysis proceeds to characterize the error signal at 133. Error signal characterization is similar to that at 105 described above, wherein the error signal may be largely negative, null, or largely positive. It is not possible to have both a low I/P drive signal and a largely positive error signal, and therefore the outcomes show at the bottom left portion of FIG. 5 are all indicated as being not valid. After error signal characterization, the diagnostics routine will characterize a pressure differential at 134 and 135. Finally, the diagnostics routine will characterize the position of the spool valve at 136–141.

As with a high drive signal deviation, analysis of a low drive signal deviation proceeds with identifying one or more possible root causes. If the error signal is largely negative, the pressure differential positive, and the spool valve position largely positive, the root cause for the fault may be a nozzle 38 that is blocked 142, a pressed I/P flapper or armature 143, a latched I/P 144, or a jammed spool valve 145. If the error signal is largely negative the pressure differential is negative, and the spool valve position is negative, the root cause for the fault may be the valve body stuck in a high position 146 or a blocked air line 147. Finally, if the error signal is null, the pressure differential is nominal, and the spool valve position is null, the root cause for the fault may be an I/P calibration shift 148, or a nozzle 38 that is partially plugged 149.

The diagnostics routine may further classify component faults according to severity and provide predictive diagnostics. Certain root causes, such as a completely plugged primary orifice 36 or nozzle 38, will bias the spool valve 26 in a manner that cannot be corrected by the processor 18. Such causes may be characterized "red light" diagnostics and reported appropriately. Other root causes may result in a large deviation in the I/P signal, but all other variables in the feedback loop are operating normally. For example, the primary orifice 36 may become partially blocked so that the I/P signal will have to be driven harder in order to compensate for the degradation in flow to the nozzle. However, the error signal, the actuator pressure, and the spool valve position will all operate normally. By comparing the I/P signal deviation with other variables in the feedback loop, we can identify degradation and flag it before it becomes a catastrophic failure. These causes may be classified as "yellow light" diagnostics.

While the diagnostics unit has been described as preferably performing processing and diagnostics using software, it may use hardware, firmware, etc. using any type of processor, such as an ASIC, etc. In any event, the recitation of a routine stored in a memory and executed on a processor includes hardware and firmware devices as well as software devices. For example, the elements described herein may be implemented in a standard multi-purpose CPU or on specifically designed hardware or firmware such as an application-specific integrated circuit (ASIC) or other hard-wired devices as desired and still be a routine executed in a processor. When implemented in software, the software routine may be stored in any computer readable memory such as on a magnetic disk, a laser disk, an optical disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

The foregoing detailed description has been given for clearness of understanding only, and no unnecessary limitations should be understood therefrom, as modifications will be obvious to those skilled in the art.

What is claimed is:

1. A method for detecting faults in a control loop for a pneumatically operated control valve, the control loop including an actuator, second stage pneumatics having a control fluid valve assembly responsive to a pressure signal for controlling flow of control fluid to the actuator, an I/P converter adapted to receive an I/P drive signal and generating the pressure signal, and a processor for delivering the I/P drive signal to the I/P converter, the method comprising:

defining a normal range for a control parameter of the control loop;

triggering a fault signal for operation of the control parameter outside the normal range;

characterizing operating parameters of the control loop during the fault signal to derive a fault template;

comparing the fault template to sets of stored operating parameters associated with specific component failures; and identifying at least one specific component failure having a set of stored operating parameters that matches the fault template.

2. The method of claim 1, in which the second stage pneumatics comprises a spool valve, and in which the control parameter comprises a spool valve position signal.

3. The method of claim 1, in which the second stage pneumatics comprises a pneumatic relay having a beam, and in which the control parameter comprises a beam position signal.

4. The method of claim 1, in which the control parameter comprises an I/P drive signal.

5. The method of claim 1, in which characterization of the operating parameters includes:

characterizing an I/P drive signal deviation as high or low;

characterizing an error signal as largely positive, null, or largely negative, wherein the error signal is equal to a reference signal minus an actuator travel signal;

characterizing an outlet port differential pressure as negative, nominal, or positive, wherein the outlet port differential pressure is equal to a first outlet port pressure minus a second outlet port pressure; and characterizing a control fluid valve assembly position as largely positive, null, or largely negative.

6. The method of claim 5, in which characterization of the operating parameters further includes characterizing the reference signal after the I/P drive signal deviation has been characterized but before the error signal, outlet port differential pressure, and control fluid valve assembly position have been characterized.

7. The method of claim 5, in which a fault template comprising a high I/P drive signal deviation, largely positive error signal, negative outlet port differential pressure, and largely negative control fluid valve assembly position is attributable to one of a group of component faults consisting of a jammed spool valve, an inlet O-ring failure, a diaphragm failure, and a blocked primary orifice.

8. The method of claim 5, in which a fault template comprising a high I/P drive signal deviation, largely positive error signal, nominal outlet port differential pressure, and largely positive control fluid valve assembly position is attributable to one of a group of component faults consisting of an external leak, a worn spool valve, and a low supply pressure.

9. The method of claim 5, in which a fault template comprising a high I/P drive signal deviation, largely positive error signal, nominal outlet port differential pressure, and largely negative control fluid valve assembly position is attributable to a low supply pressure.

10. The method of claim 5, in which a fault template comprising a high I/P drive signal deviation, largely positive error signal, positive outlet port differential pressure, and largely positive control fluid valve assembly position is attributable to one of a group of component faults consisting of a throttling element stuck at low travel, a blocked air line, and an active interlock.

11. The method of claim 5, in which a fault template comprising a high I/P drive signal deviation, null error signal, nominal outlet port differential pressure, and null control fluid valve assembly position is attributable to one of a group of component faults consisting of a partially plugged primary orifice, grit in the armature, and a shift in I/P calibration.

12. The method of claim 5, in which a fault template comprising a low I/P drive signal deviation, largely negative error signal, positive outlet port differential pressure, and largely positive control fluid valve assembly position is attributable to one of a group of component faults consisting of a blocked I/P nozzle, a pressed I/P armature, a latched I/P, and a jammed spool valve.

13. The method of claim 5, in which a fault template comprising a low I/P drive signal deviation, largely negative error signal, negative outlet port differential pressure, and largely negative control fluid valve assembly position is attributable to one of a group of component faults consisting of a valve stuck in a high position and a blocked air line.

14. The method of claim 5, in which a fault template comprising a low I/P drive signal deviation, null error signal, nominal outlet port differential pressure, and null control fluid valve assembly position is attributable to one of a group of component faults consisting of a shift in I/P calibration and a partially plugged I/P nozzle.

15. A control loop for positioning a throttling element of a pneumatically operated control valve, the control loop comprising:

an actuator for driving the throttling element, the actuator defining first and second control chambers;

second stage pneumatics having an inlet port in fluid communication with a control fluid supply, first and second outlet ports in fluid communication with the first and second actuator control chambers, respectively, and a control fluid valve assembly for controlling flow of control fluid from the inlet port to the first and second outlet ports;

an I/P converter having a pressure-responsive diaphragm engaging the control fluid valve assembly, the I/P converter further including an inlet in fluid communication with the control fluid supply and an outlet for directing control fluid to the diaphragm;

at least one sensor for detecting an operating parameter;

a processor communicatively coupled to the at least one sensor for providing a drive signal to the I/P converter; and a diagnostics unit communicatively coupled to the processor, the diagnostics unit including a memory programmed to:

define a normal range for the operating parameter;

trigger a fault signal for operation of the control parameter outside of the normal range;

characterize operating parameters of the control loop during the fault signal to derive a fault template;

compare the fault template to sets of stored operating parameters associated with specific component failures; and identify at least one specific potential component failure having a set of stored operating parameters corresponding to the fault template.

16. The control loop of claim 15, in which the control fluid valve assembly comprises a spool valve, and in which the control parameter comprises a spool valve position signal.

17. The control loop of claim 15, in which the control fluid valve assembly comprises a pneumatic relay having a beam, and in which the control parameter comprises a beam position signal.

18. The control loop of claim 15, in which the control parameter comprises an I/P drive signal.

19. The control loop of claim 15, in which the at least one sensor comprises an inlet port sensor in fluid communication with the second stage pneumatics inlet port, a first outlet port sensor in fluid communication with the second stage pneumatics first outlet port, a second outlet port sensor in fluid communication with the second stage pneumatics second outlet port, and a displacement sensor for determining a control fluid valve assembly position, and in which the memory is programmed to:

characterize an I/P drive signal deviation as high or low;

characterize an error signal as largely positive, null, or largely negative, wherein the error signal is equal to a reference signal minus an actuator travel signal;

characterize an outlet port differential pressure as negative, nominal, or positive, wherein the outlet port differential pressure is equal to a first outlet port pressure minus a second outlet port pressure; and characterize the control fluid valve assembly position as largely positive, null, or largely negative.

20. The control loop of claim 19, in which the memory is further programmed to characterize the reference signal after the I/P drive signal deviation has been characterized but before the error signal, outlet port differential pressure, and control fluid valve assembly position have been characterized.

21. A method for detecting faults in a control loop for a pneumatically operated control valve, the control loop including an actuator, a control fluid valve assembly adapted to receive a pressure signal and control flow of control fluid to the actuator, an I/P converter coupled to the control fluid valve assembly, and a processor for delivering an I/P drive signal to the I/P converter, the method comprising:

monitoring the I/P drive signal and at least one operating parameter of the control loop during normal operation of the control valve;

generating a fault signal based on the I/P drive signal and the at least one operating parameter in accordance with a logic sub-routine.

22. The method of claim 21, in which the at least one operating parameter comprises a control fluid valve assembly position.

23. The method of claim 22, in which the fault signal is generated when the I/P drive signal exhibits a sustained increase and the control fluid valve assembly position is at null.

24. The method of claim 23, in which the fault signal indicates a plugged primary orifice in the I/P converter.

25. The method of claim 23, in which the fault signal indicates a failure of an outlet O-ring in the I/P converter.

26. The method of claim 22, in which the fault signal is generated when the I/P drive signal exhibits a sustained decrease and the control fluid valve assembly position is positive.

27. The method of claim 26, in which the fault signal indicates a plugged nozzle in the I/P converter.

28. The method of claim 26, in which the control fluid valve assembly comprises a spool valve and the control fluid valve assembly position comprises a spool valve position.

29. The method of claim 26, in which the control fluid valve assembly comprises a pneumatic relay having a beam, and the control fluid valve assembly position comprises a beam position.

* * * * *

UNITED STATES PATENT AND TRADEMARK OFFICE
CERTIFICATE OF CORRECTION

PATENT NO. : 6,954,683 B2
APPLICATION NO. : 10/644207
DATED : October 11, 2005
INVENTOR(S) : Kenneth W. Junk et al.

It is certified that error appears in the above-identified patent and that said Letters Patent is hereby corrected as shown below:

Col. 5, line 53: Delete "$dm/dt=0.048KYA(p_1-p_2))^{1/2}$" and insert instead -- $dm/dt=0.048\ KYA(p_1(p_1-p_2))^{1/2}$ --.

Signed and Sealed this

Nineteenth Day of December, 2006

JON W. DUDAS
*Director of the United States Patent and Trademark Office*